Patented Oct. 2, 1928.

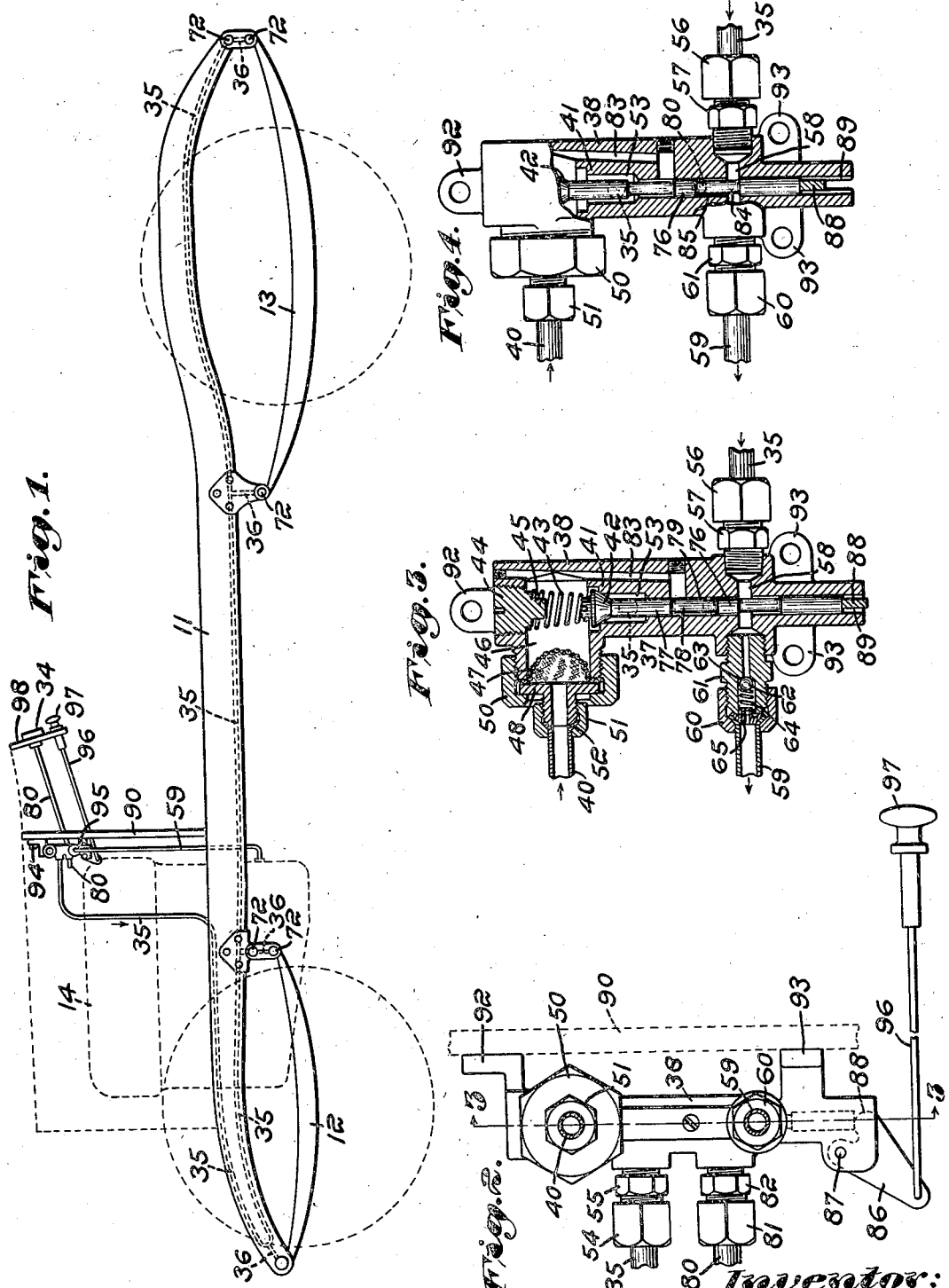

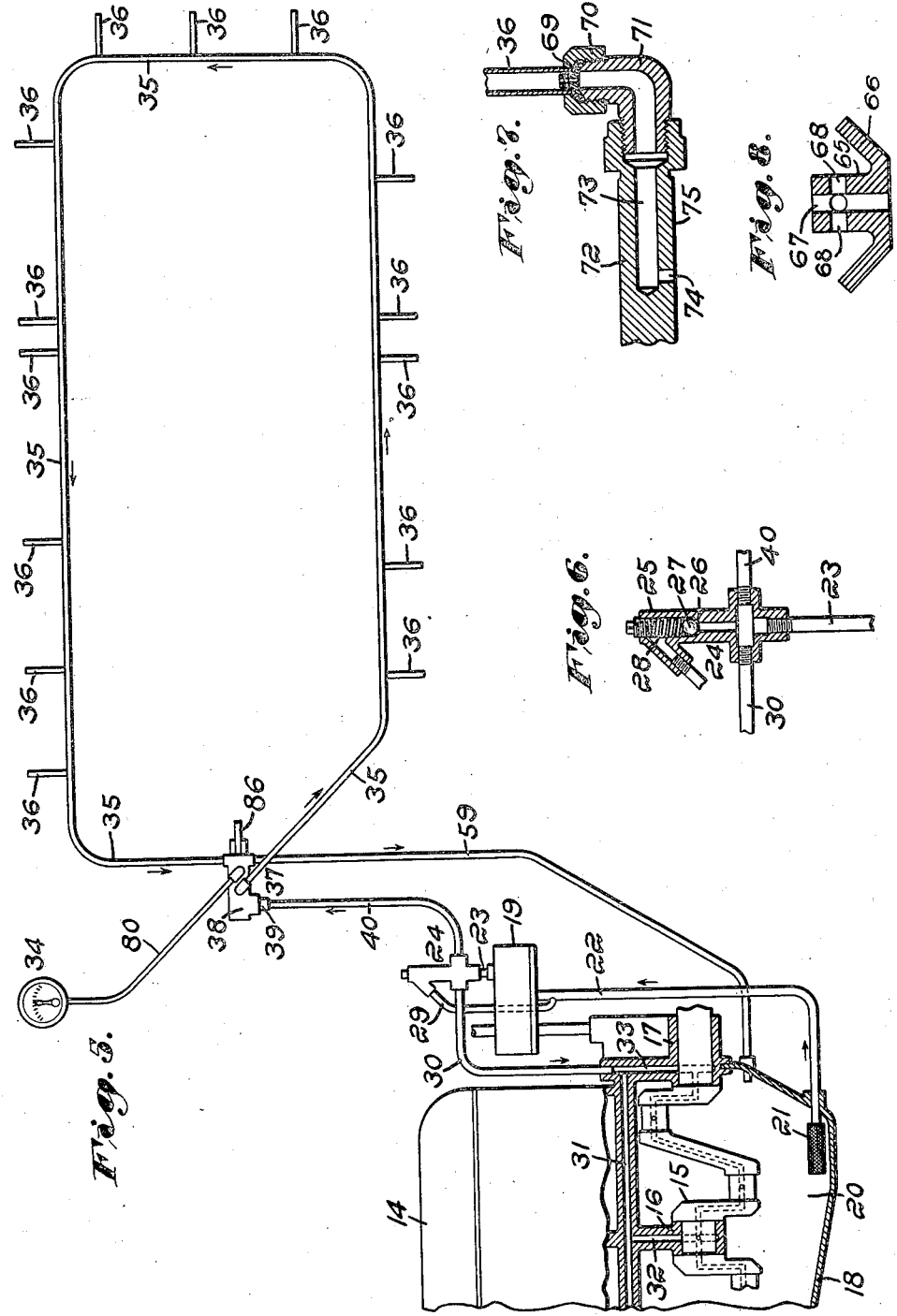

1,685,976

UNITED STATES PATENT OFFICE.

FREDERICK C. BLANCHARD, OF DORCHESTER, MASSACHUSETTS.

LUBRICATING SYSTEM.

Application filed July 3, 1925. Serial No. 41,349.

This invention relates to a novel lubricating system for motor vehicles, motor driven water and air-craft, and for other situations including stationary plants where there are bearings to be lubricated extraneous to the engine.

The invention will be best understood by reference to the following description, when taken in connection with the accompanying drawings of one specific embodiment thereof, while its scope will be more particularly pointed out in the appended claims.

In the drawings:

Fig. 1 is a side elevation of a motor vehicle chassis equipped with a lubricating system exemplifying the invention;

Fig. 2 is an elevation on an enlarged scale, illustrating the manually-operable control valve of the system;

Fig. 3 is a sectional view on line 3—3 of Fig. 2;

Fig. 4 is a sectional view, similar to Fig. 3, but showing the valve positioned for the lubrication of the extraneous bearings;

Fig. 5 is a diagrammatic view illustrating the system;

Fig. 6 is a sectional view on an enlarged scale, illustrating the pressure relief valve;

Fig. 7 is a sectional view on an enlarged scale, illustrating a typical extraneous bearing in connection with a delivery branch furnishing oil thereto; and Fig. 8 is a sectional view, on an enlarged scale, illustrating one of the "chokes" used in connection with the extraneous system.

Referring to the drawings, and to the embodiment of the invention selected for exemplification, and having reference at first to Fig. 1, there is shown a motor car chassis comprising a frame 11, supported by front and rear springs 12 and 13, and in turn supporting an engine 14 of common form, having a crank-shaft 15 (see Fig. 5), mounted in bearings 16 and 17 within a crank-case 18. The various bearing surfaces of the engine, including those of the crank-shaft, are lubricated by an engine-driven pump 19, which draws oil from a reservoir 20 presented by the crank-case through a screen 21 and inlet pipe 22, and delivers the same through an outlet pipe 23 to a relief valve of common form, designated generally by the numeral 24, best shown in Fig. 6. This valve comprises a casing 25, which presents a seat 26 for a valve 27, usually a ball which is urged toward its seat by a spring 28. When the pressure rises to a predetermined point, the valve opens and by-passes some of the oil through a pipe 29 to the inlet side of the pump, sometimes directly back to the crank-case, and sometimes into the pump inlet. The latter form is shown in the present example for the sake of simplicity. The remainder of the oil is usually delivered at the predetermined pressure through a pipe 30, and passages such as passages 31, 32 and 33, to the various bearings of the motor. There is usually provided an oil pressure indicator such as a gage 34, to indicate the pressure predetermined by the relief valve.

Engine-driven land vehicles, as well as water and air-craft, usually have a number of bearing surfaces extraneous to the engine and extraneous to the driving mechanism, which require lubrication. This invention contemplates the lubrication of these extraneous bearings by connecting them temporarily to the engine lubricating system. The system presents many advantages, some of which will be outlined briefly. Oil is taken from the crank-case of the engine, thereby assuring the use of a high-grade lubricant for the extraneous bearings throughout the chassis. A thoroughly heated oil is thus provided for the extraneous bearings. This oil will flow freely even in the coldest weather, when practically all oils not heated become so sluggish that they will not flow to the surfaces to be lubricated. An ample supply of oil is assured at all times, because a motorist is usually very careful to see that the crank-case has an ample supply of oil, and the motor will not run very far unless there is a sufficient supply. By using the motor reservoir for the extraneous bearings, no filling of a separate reservoir is necessery, and no quantity of oil is stored, or carried outside of the crank-case. The use of the usual motor oil pump for supplying the extraneous bearings saves the cost of a seperate pump, and is accomplished with greater ease than by the use of the hand-operated pump. The pressure regulating valve provided for the motor also develops and controls the pressure of oil supplied to the extraneous bearings.

In the present example, the extraneous bearings, like the engine bearings, are supplied by a circulating system which has several advantages. Its proper functioning requires that a considerable volume of oil shall be circulated therethrough, thus placing the outlets to all extraneous bearings under the same pressure, and assuring greater supply and distribution of oil to all points. Any air which may enter the system will be carried through and out with the first circulation of the oil, and thus the system is put into true hydraulic condition. In cold weather, a heated oil may be circulated through the system, thus carrying out the cold oil and warming the pipes, thereby assuring that the oil may reach the parts to be lubricated. There is no waste of oil, because the surplus flows back to the source of supply, herein the crankcase and oil remaining in the distribution line is held there by means for the prevention of entrance of air in a manner presently to be described.

To these ends, the extraneous system comprises a conduit 35, in the form of a circuit which extends past all of the points to be lubricated, and at each of such points there is provided a branch 36. This circuit is placed in communication with the motor oiling system by the use of a manually-operable controlling valve (designated generally by the numeral 37), which will now be described, reference being had at first to Fig. 5. This valve comprises a casing 38, having an inlet 39, to which is connected a conduit 40, which leads from any appropriate part of the motor circulating system in which a predetermined pressure is carried by reason of the provision of the relief valve. In the present example, this pipe is connected (see Fig. 6) to the valve casing 26.

Referring now to Fig. 3, the valve casing 38 presents a seat 41 for an appropriate valve, herein a poppet valve 42, which is urged toward its seat by an appropriate spring 43, one end of which is seated against an abutment presented by the valve, while the other end is seated against an abutment presented by a plug 44, threaded into the valve casing. Opening movement of the valve in opposition to the spring is limited by an appropriate stop, herein an abutment 45 presented by the plug 44. This stop predetermines the travel of the valve. The head of the valve is exposed within a chamber 46, which is in communication with the conduit 40, and hence the valve is always subject to the pressure of the oil in the motor-lubricating system. All oil entering the chamber 46 passes through a screen 47, which is clamped between the valve casing and a nipple 48 by a kind of union coupling comprising a collar 50 threaded onto the valve casing. This nipple in turn is connected to the pipe 40 by a union coupling of common form comprising a collar 51 threaded onto the nipple, and clamped against the end of the latter is a bell-mouthed or flared end 52, presented by the pipe. By this means, the screen is rendered accessible for inspection and cleaning, by unscrewing the collar 51 and bending the pipe 40 sidewise, after which the collar 50 may be unscrewed to dismount the nipple and screen. The valve casing 38 presents another chamber 53, which is always in communication with the pipe 35, the latter being attached to the valve casing (see Fig. 2), by a union coupling 54 and nipple 55. When, therefore, the valve 42 is opened, communication is established between the motor lubricating system and the extraneous system.

The return end of the pipe 35 is led back to the crank-case herein by way of the valve casing 38, to which it is connected (see Fig. 3) by a union coupling 56 and nipple 57, and the casing is provided with a transverse passage 58, to the other end of which a conduit 59 is connected by a union coupling 60 and nipple 61. The conduit 59 (see Fig. 5) discharges into the crank-case. At a convenient point in this return portion of the feed line, there is placed a check valve which prevents the entrance of air from the crank-case into the feed line, and thereby causes oil remaining in the distribution line to be held there, and thus prevented from seeping through the outlets. In the present embodiment, there is provided for this purpose a check valve 62 (see Fig. 3), cooperating with the seat 63 presented by the nipple 61, toward which seat the valve is urged by a spring 64. This is a convenient point also for the insertion of a "choke" to ensure the building up of a sufficient pressure in the distribution line, the "choke" in the present example comprising a plug 65, shown in detail in Fig. 8. This plug is provided with a flange 66, which is clamped between the end of the nipple 61 and the flared end of the pipe 59 by the union coupling 60 (see Fig. 3). The choke 65 (see Fig. 8) presents an axial passage 67 and a plurality of radial passages 68 leading therefrom, so that several outlets are presented, and if one or more become clogged, it is likely that at least one will remain clear. This choke, together with the associated check valve, presents a sufficient obstruction at the return end of the feed line to ensure the building up in the latter of ample pressure. It should of course be understood that this same condition pertains to the various branches 36 leading to the extraneous bearings, and to this end, each of them (see Fig. 7) is provided with a choke 69 similar to the choke 65, and secured in a similar manner by a union coupling 70, having a fitting 71 of appropriate form, which is suitably connected to the part to be lubricated.

A typical extraneous bearing is illustrated in Fig. 7 by a spring bolt 72, to which the fitting 71 is secured by threading the same into one end of the bolt, the latter being provided with a longitudinal passage 73 communicating with the fitting, and a transverse passage 74 leading from the longitudinal passage to a bearing surface 75 to be lubricated. In the case of a spring bolt, this will be the usual bushing inserted in the spring eye.

It will be remembered that a gage 34 is provided in connection with the motor oiling system, to furnish a visual indication of the pressure existing in the system when the engine and pump are in operation. It is equally desirable that there shall be a visual indication of the pressure in the extraneous oiling system when the latter is temporarily placed in communication with the motor oiling system. To this end, therefore, there is provided a valve 76 (see Fig. 3), herein a piston carried by and in fact conveniently formed as an integral part of a stem 77 presented by the valve 42. The stem has a reduced portion 78, which is surrounded by an annular chamber 79, normally communicating by way of a conduit 80 (see Figs. 2 and 5) with the oil pressure gage. This conduit, as shown in Fig. 2, is attached to the valve casing 38 by a union coupling 81 and a nipple 82. Also communicating with the chamber 79 is a passage 83 (see Fig. 3), which leads to the chamber 46, the latter, it will be remembered, being at all times in communication with the outlet of the pump. It follows that, in the normal operation of the motor oiling system, the oil pressure gage is in communication with the pump, and therefore indicates the pressure in the motor oiling system.

The length of the piston valve 76, the travel of the valve, and the location of the port leading to the conduit 80, are such that when the valve 42 is opened to establish communication between the motor oiling system and the extraneous system, the piston valve 76 closes communication between the oil gage pipe 80 and the passage 83, and establishes communication between the oil gage pipe and the return end of the pipe 35, which (see Fig. 4), it will be remembered, communicates with the transverse passage 58 in the valve casing. The valve stem is provided with a second reduced portion 84, which makes this result possible, inasmuch as there is thus provided about this reduced portion an annular passage 85, which affords communication between the pipe 35 and the pipe 80.

Inasmuch as the valves 42 and 76 are connected together, their operation is conjoint, and operation of one is accompanied by corresponding operation of the other. The operation of both is conveniently accomplished in the present example by the use of a small bell-crank lever 86 (see Fig. 2), herein fulcrumed on a pivot 87 on the valve casing, and having an arm 88, which engages the adjacent end of the valve stem. As shown in Fig. 4, the valve casing is provided with a slot 89, which receives the lever, and affords a guide therefor.

The controlling valve may be located at any convenient point, such as on the front face of a dash 90 (see Fig. 1), to which the valve casing may be secured by providing the same with feet 92 and 93, secured to the dash by bolts or screws 94 and 95. The lever 86 may be operated by appropriate means located at any convenient point. In the present example, a rod 96, pivotally connected to the lever, leads to a knob 97, which extends through an instrument panel 98 (see Fig. 1), which also supports the oil pressure gage.

The operation is quick, easy, clean and economical. It is only necessary to pull out the knob on the instrument panel and hold it for a few seconds while the motor is running, watching the pressure gage and noting that, first, during the change of position of the valve, the pressure drops to zero, and then rises approximately to the pressure in the motor lubricating system. The knob is then released, and the extraneous system is automatically disconnected from the oil pressure gage, as well as from the motor lubricating system. During the restoration of the valve to its normal position, the gage momentarily drops, and then rises again, now indicating the oil pressure in the motor lubricating system. While the gage thus performs a dual function, and at one time furnishes a visual indication of the pressure in first one system and then the other, the motor lubrication is not interrupted, while the extraneous bearings are being lubricated.

The construction is such that no oil pipes, sight feeds, or reservoirs for the chassis oiling, are brought into the front compartment of the car, where leakage of oil might result in damage to clothing and other surrounding objects. Only a small amount of oil is needed for the lubrication of the bearings of the chassis; it amounts to about a cent's work of oil, and is less than one per cent (1%) of the oil in the crank-case. In a few seconds' time, with the motor running and the car either standing or running on the road, all of the chassis bearings are sufficiently lubricated. Lubrication is positive and reliable, because uniform pressure of indicated intensity is applied to all outlets. There are no distribution nor check valves, nor filters at the lubrication points, all of which would be likely to become damaged or clogged by dirt or sediment. The pressure indicated by the gage shows definitely that the system is functioning correctly. Inasmuch as a single gage is used for both systems, the correctness of the calibration of the gage is of no particular consequence, because if, when used in connection with the extraneous system, the gage gives the same reading that it did when connected to the engine oiling system only, the operator knows that the same pressure is being applied to the extraneous bearings. In short, the system presents many important advantages.

Having thus described one embodiment of the invention, but without limiting myself thereto, what I claim and desire by Letters Patent to secure is:

1. In a lubricating system, the combination of an engine having bearings, an oil reservoir, a pump taking oil from said reservoir, bearings extraneous to said engine, an oil pressure indicator, and valve means having two positions, one in which said engine bearings and said indicator are in communication with the pump outlet and in which said indicator indicates the pressure of the oil being supplied to said engine bearings, and the other in which said extraneous bearings and said indicator are in communication with the pump outlet and in which said indicator indicates the pressure of the oil being supplied to said extraneous bearings to the exclusion of said engine bearings.

2. In a lubricating system, the combination of an engine having bearings, an oil reservoir, a pump taking oil from said reservoir, bearings extraneous to said engine, an oil indicator, means at will to connect the outlet of said pump to said engine bearings only or to said engine bearings and said extraneous bearings, and means at will to connect said indicator to said engine bearings or to said extraneous bearings to the exclusion of said engine bearings.

3. In a motor vehicle, the combination of an engine having bearings, a lubricating system for said engine, a plurality of extraneous bearings which afford support for said engine, an extraneous circulatory lubricating system for said extraneous bearings, and an oil pressure indicator which serves both lubricating systems and which indicates the pressure in the return side of said extraneous system.

4. In a motor vehicle, the combination of an engine having bearings, a lubricating system for said engine, a plurality of extraneous bearings, a lubricating system for said extraneous bearings, an oil pressure indicator, and means at will to render said indicator available for use in connection with either of said systems to the exclusion of the other.

5. In a motor vehicle, the combination of an engine having bearings and a lubricating system therefor, an engine supporting frame, a plurality of bearings affording support for said frame, a lubricating system for the last-mentioned bearings, an oil pressure indicator, and a valve which in one position renders said indicator available for use with one of said systems and which, in another position, renders said indicator available for use with the other of said systems.

6. In a motor vehicle, the combination of an engine having bearings, a lubricating system for said engine, a plurality of extraneous bearings, a lubricating system for said extraneous bearings, an oil pressure indicator, means at will to render said indicator available for use in connection with either of said systems to the exclusion of the other, and means automatically to restore the last-mentioned means to the position in which it serves said engine lubricating system to the exclusion of the other system.

7. In a motor vehicle, the combination of an engine having bearings and a lubricating system therefor, an engine supporting frame, a plurality of bearings affording support for said frame, a lubricating system for the last-mentioned bearings, an oil pressure indicator, a valve which in one position renders said indicator available for use with one of said systems and which, in another position, renders said indicator available for use with the other of said systems, and means tending to restore said valve to the position in which said indicator is available for use in connection with said engine lubricating system only, after it has been used for the other of said systems.

8. In an engine driven vehicle, the combination of an engine, an oil reservoir, an engine driven pump having its inlet taking oil from said reservoir, a circulatory oiling system extraneous to said engine and having a main inlet receiving oil from the outlet of said pump, a main outlet leading back to said reservoir, and bearing outlets between said main inlet and said main outlet, and a check valve and a choke between the most remote bearing outlet and said main outlet to cause the building up of pressure in said extraneous system and to place said bearing outlets under pressure.

9. In an engine driven vehicle, the combination of an engine, an oil reservoir, an engine driven pump having its inlet taking oil from said reservoir, a circulatory oiling system extraneous to said engine and having a main inlet receiving oil from the outlet of said pump, a main outlet leading back to said reservoir, and bearing outlets between said main inlet and said main outlet, means between the most remote bearing outlet and said main outlet to cause the building up of pressure in said extraneous system and to place said extraneous bearing outlets under pressure, and pressure indicating means to indicate the oil pressure intermediate the last-mentioned means and said remote bearing.

10. The combination of an engine having a circulatory oiling system including a pump, an extraneous circulatory oiling system having a plurality of outlets and a return connection to said engine, means to open and close communication between said engine system and said extraneous system, a regulating valve for regulating the pressure of the oil supplied to said engine bearings as well as that released from said engine system to said extraneous system, and means in said return connection for determining the pressure of the oil impressed upon said outlets.

In testimony whereof, I have signed my name to this specification.

FREDERICK C. BLANCHARD.